(12) United States Patent
Jo et al.

(10) Patent No.: US 10,310,224 B2
(45) Date of Patent: Jun. 4, 2019

(54) SUBMINIATURE OPTICAL SYSTEM AND PORTABLE DEVICE INCLUDING THE SAME

(71) Applicant: Samsung Electro-Mechanics Co., Ltd., Suwon-si (KR)

(72) Inventors: Yong Joo Jo, Suwon-si (KR); Young Suk Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/381,185

(22) Filed: Dec. 16, 2016

(65) Prior Publication Data

US 2017/0097495 A1 Apr. 6, 2017

Related U.S. Application Data

(63) Continuation of application No. 14/927,682, filed on Oct. 30, 2015, now Pat. No. 9,846,296, which is a
(Continued)

(30) Foreign Application Priority Data

Jan. 22, 2013 (KR) .......................... 10-2013-0007047

(51) Int. Cl.
*G02B 9/60* (2006.01)
*G02B 13/00* (2006.01)
(Continued)

(52) U.S. Cl.
CPC ........... *G02B 13/0045* (2013.01); *G02B 9/60* (2013.01); *G02B 27/0025* (2013.01);
(Continued)

(58) Field of Classification Search
CPC .............................. G02B 13/0045; G02B 9/60
(Continued)

(56) References Cited

U.S. PATENT DOCUMENTS 4,173,396 A 11/1979 Yokota
4,451,125 A 5/1984 Sato
(Continued)

FOREIGN PATENT DOCUMENTS

CN 101149466 A 3/2008
CN 201754201 U 3/2011
(Continued)

OTHER PUBLICATIONS

Human Translation JP 59-083121; Mar. 2018.*
(Continued)

*Primary Examiner* — Zachary W Wilkes
(74) *Attorney, Agent, or Firm* — NSIP Law

(57) ABSTRACT

There are provided a subminiature optical system having a miniature size and capable of obtaining a narrow view angle using only five sheets of lenses, and a portable device having the same. The subminiature optical system includes a first lens convex toward the object side and having positive refractive power a second lens concave toward an image side and having negative refractive power, a third lens convex toward the object side and having positive refractive power, a fourth lens concave toward the image plane and having negative refractive power, and a fifth lens convex toward the image plane and having negative or positive refractive power, sequentially from an object side.

17 Claims, 7 Drawing Sheets

Related U.S. Application Data continuation of application No. 13/862,102, filed on Apr. 12, 2013, now Pat. No. 9,405,099.

(51) Int. Cl.
| | | |
|---|---|---|
| *G02B 27/00* | (2006.01) | |
| *G02B 1/04* | (2006.01) | |
| *G02B 5/20* | (2006.01) | |
| *H04N 13/282* | (2018.01) | |

(52) U.S. Cl.
CPC .............. *G02B 1/041* (2013.01); *G02B 5/208* (2013.01); *H04N 13/282* (2018.05)

(58) Field of Classification Search
USPC ......................................................... 359/714
See application file for complete search history.

(56) References Cited

U.S. PATENT DOCUMENTS

| | | | |
|---|---|---|---|
| 4,465,345 A | 8/1984 | Yazawa | |
| 5,011,272 A | 4/1991 | Nakayama et al. | |
| 5,774,279 A * | 6/1998 | Kiriki | G02B 13/04 359/708 |
| 6,094,312 A | 7/2000 | Nakayama | |
| 7,859,588 B2 | 12/2010 | Parulski et al. | |
| 8,072,695 B1 | 12/2011 | Lee et al. | |
| 8,248,713 B2 | 8/2012 | Hsieh et al. | |
| 8,325,430 B1 | 12/2012 | Tsai | |
| 8,390,940 B2 | 3/2013 | Tsai et al. | |
| 8,456,758 B1 | 6/2013 | Huang et al. | |
| 8,488,258 B2 | 7/2013 | Shabtay et al. | |
| 8,749,892 B2 * | 6/2014 | Shabtay | G02B 7/102 359/648 |
| 8,780,466 B2 | 7/2014 | Hsieh et al. | |
| 8,810,924 B2 | 8/2014 | Kondo et al. | |
| 8,896,936 B2 * | 11/2014 | Tsai | G02B 13/0045 359/714 |
| 9,405,099 B2 | 8/2016 | Jo et al. | |
| 9,846,296 B2 | 12/2017 | Jo et al. | |
| 10,191,249 B2 | 1/2019 | Jo et al. | |
| 2003/0020814 A1 | 1/2003 | Ono | |
| 2008/0088945 A1 | 4/2008 | Satori | |
| 2010/0328730 A1 | 12/2010 | Otomo | |
| 2011/0157725 A1 | 6/2011 | Baba | |
| 2011/0261250 A1 | 10/2011 | Touchi et al. | |
| 2011/0273611 A1 | 11/2011 | Matsusaka et al. | |
| 2011/0304928 A1 | 12/2011 | Abe | |
| 2012/0019925 A1 | 1/2012 | Kurioka et al. | |
| 2012/0099211 A1 | 4/2012 | Peng et al. | |
| 2012/0262797 A1 | 10/2012 | Sugita | |
| 2013/0093942 A1 | 4/2013 | Okano | |
| 2014/0204480 A1 | 7/2014 | Jo et al. | |

FOREIGN PATENT DOCUMENTS

| | | |
|---|---|---|
| CN | 102109661 A | 6/2011 |
| CN | 102483512 A | 5/2012 |
| CN | 102736215 A | 10/2012 |
| CN | 102736227 A | 10/2012 |
| JP | 59-83121 A | 5/1984 |
| JP | 62-183419 A | 8/1987 |
| JP | 05-264899 A | 10/1993 |
| JP | 09-080302 A | 3/1997 |
| JP | 63-63012 A | 3/1998 |
| JP | 2010-256608 A | 11/2010 |
| JP | 2011-237547 A | 11/2011 |
| JP | 2012-8490 A | 1/2012 |
| JP | 2012-88702 A | 5/2012 |
| JP | 2012-177831 A | 9/2012 |
| KR | 10-2008-0057738 A | 6/2008 |
| KR | 10-2008-0061461 A | 7/2008 |
| KR | 10-1111204 B1 | 2/2012 |
| KR | M440441 U | 11/2012 |
| WO | WO 2012/086194 A1 | 6/2012 |

OTHER PUBLICATIONS

United States Office Action dated Mar. 31, 2017 in counterpart U.S. Appl. No. 14/927,682 (22 pages in English).
United States Office Action dated Mar. 19, 2018, in correesponding U.S. Appl. No. 15/075,928 (28 pages, in English).
Office Action dated Oct. 10, 2015 in corresponding Chinese Patent Application No. 201410010432.0, 6 pages in English, 5 pages in Chinese.
Chinese Office Action dated Jun. 3, 2016 in counterpart Chinese Patent Application No. 201410010432.0 (6 pages in English; 5 pages in Chinese).
Korean Office Action dated Jan. 21, 2014, in the corresponding Korean Patent Application No. 10-2013-0007047, 4 pages in English, 4 pages in Korea.
Taiwanese Office Action dated Oct. 16, 2014, in the corresponding Taiwanese Patent Application No. 102146792, 5 pages in Taiwanese, 4 pages in English.
Taiwanese Office Action dated May 22, 2015 in the corresponding Taiwanese Patent Application No. 102146792, 5 pages in English, 5 pages in Taiwanese.
United States Office Action dated Aug. 2, 2017 in corresponding U.S. Appl. No. 14/927,682 (14 pages in English).
Chinese Office Action dated Aug. 28, 2018 in corresponding Chinese Patent Application No. 201710182581.9 (8 pages in English, 6 pages in Chinese).
United States Office Action dated Oct. 10, 2018 in related U.S. Appl. No. 15/381,218 (21 pages in English).
United States Office Action issued on May 25, 2018 in the corresponding application U.S. Appl. No. 15/381,218. (29 pages in English).
United States Office Action issued on Apr. 1, 2019 in related U.S. Appl. No. 15/381,218 (12 pages in English).

* cited by examiner

SUBMINIATURE OPTICAL SYSTEM AND PORTABLE DEVICE INCLUDING THE SAME

CROSS-REFERENCE TO RELATED APPLICATION

This application is a Continuation of U.S. patent application Ser. No. 14/927,682 filed Oct. 30, 2015, which is a Continuation of U.S. patent application Ser. No. 13/862,102 filed on Apr. 12, 2013, which claims the benefit under 35 USC 119(a) of Korean Patent Application No. 10-2013-0007047 filed on Jan. 22, 2013, in the Korean Intellectual Property Office, the entire disclosures of which are incorporated herein by reference for all purposes.

BACKGROUND OF THE INVENTION

Field of the Invention

The present invention relates to a subminiature optical system and a portable device including the same, and more particularly, to a subminiature optical system having a subminiature size, capable of obtaining a narrow view angle using five sheets of lenses and a portable device including the same.

Description of the Related Art

Initial portable terminals only included a communications function. However, in accordance with an increase in the usage of portable terminals, various functions such as image capturing and the ability to transmit images via communications networks have been implemented in portable terminals. Therefore, functions of, and services available with regard to portable terminals are constantly evolving. Therefore, digital camera technology, camcorder technology, and the like have become basic functions of portable terminals such as mobile phones.

Camera and camcorder technologies included in mobile phones require general camera and camcorder performance, while the miniaturization and lightening of image capturing lenses have been strongly demanded.

Therefore, in order to satisfy the above-mentioned requirement, the number of the lens provided as image capturing lenses mounted in mobile phones needs to be decreased by as much as possible. However, it may be difficult to satisfy the requirements for a desired level of optical performance due to a lack of design freedom resulting therefrom.

In addition, wide-angle optical systems able to capture images of 70 degrees or more have recently been employed in order to capture images having wider backgrounds. However, the wide-angle optical system is suitable for capturing images having wide backgrounds, but is not suitable for imaging a subject by zooming in on a distant object.

Therefore, an optical system having a small size and capable of clearly imaging a subject at a long distance is required.

RELATED ART DOCUMENT

Korean Patent Laid-Open Publication No. 2008-0057738

SUMMARY OF THE INVENTION

An aspect of the present invention provides a subminiature optical system having high resolution and having a compact shape and the short overall length due to only five sheets of lenses being used therein, and a portable device including the same.

In addition, an aspect of the present invention provides a subminiature optical system having a narrow view angle of 35 degrees or less and a portable device including the same.

According to an aspect of the present invention, there is provided a subminiature optical system, including: sequentially from an object side, a first lens convex toward the object side and having positive refractive power; a second lens concave toward an image side and having negative refractive power; a third lens convex toward the object side and having positive refractive power; a fourth lens concave toward the image plane and having negative refractive power; and a fifth lens convex toward the image plane and having negative or positive refractive power.

A focal distance of the optical system may satisfy the following Conditional Equation 1, $0.7<TTL/F<1.0$  (Conditional Equation 1)

where TTL indicates a distance from a first surface, an object side surface, of an optical lens to the image plane, and F indicates the focal distance of the optical system.

A view angle of the optical system may satisfy the following Conditional Equation 2, $20<FOV<35$  (Conditional Equation 2)

where FOV indicates the view angle of the optical system.

The first lens of the optical system may satisfy the following Conditional Equation 3, $0.16<rdy\ s1/F<2$  (Conditional Equation 3)

where rdy s1 indicates a radius of curvature of the object side surface of the first lens, and F indicates the focal distance of the optical system.

An Abbe number of the fourth lens may satisfy the following Conditional Equation 4, $Vd4>50$  (Conditional Equation 4)

where Vd4 indicates the Abbe number of the fourth lens.

The fourth lens may have both surfaces thereof formed to be concave.

The fifth lens may have at least one inflection point formed in a location thereof other than a location corresponding to an optical axis.

The subminiature optical system may further include an aperture stop disposed on the object side of the first lens.

According to an aspect of the present invention, there is provided a portable device, including: a first optical system; and a second optical system having a view angle narrower than that of the first optical system.

The second optical system may have the view angle of 35 degrees or less.

The first optical system may have the view angle of 60 degrees through 80 degrees.

The second optical system may include: sequentially from an object side, a first lens convex toward the object side and having positive refractive power; a second lens concave toward an image side and having negative refractive power; a third lens convex toward the object side and having positive refractive power; a fourth lens concave toward the image plane and having negative refractive power; and a fifth lens convex toward the image plane and having negative or positive refractive power.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the inventive concept will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
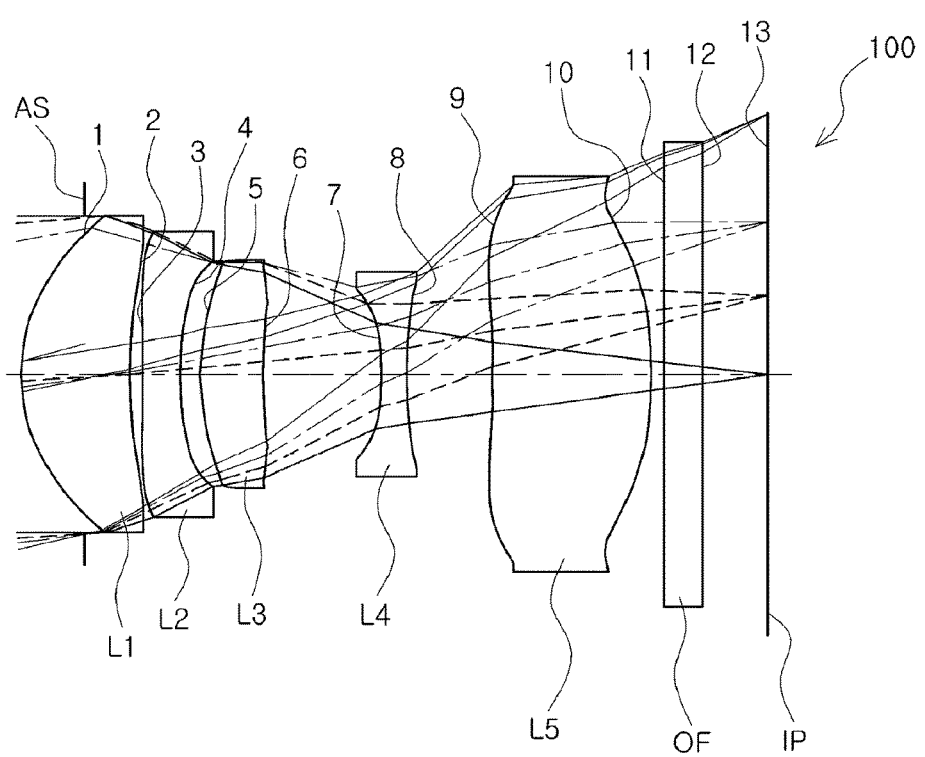
FIG. 1 is a lens configuration diagram showing a lens arrangement of a subminiature optical system according to a first embodiment of the present invention.

FIG. 1 is a lens configuration diagram showing a subminiature optical system according to a first embodiment of the present invention. In the following lens configuration diagrams, thicknesses, sizes and shapes of the lenses depicted therein are slightly exaggerated for descriptive purposes. Particularly, shapes of semispherical surfaces or aspherical surfaces suggested in the lens configuration diagram are only examples. Therefore, the lenses of the present invention are not to be construed as being limited to the above-mentioned shapes.

As shown in FIG. 1, a subminiature optical system 100 according to the embodiment of the present invention is configured to include a first lens L1, a second lens L2, a third lens L3, a fourth lens L4, and a fifth lens L5, disposed sequentially from an object side. Therefore, light corresponding to image information of a subject passes through the first lens L1, the second lens L2, the third lens L3, the fourth lens L4, and the fifth lens L5 so as to be incident to an image plane IP, that is, light receiving element.

The first lens L1, according to the present embodiment, is convex toward the object side and has positive refractive power. Here, an aperture stop (AS) adjusting an amount of light may be provided between the first lens L1 and the object.

The second lens L2 is concave toward an image side and has negative refractive power.

The third lens L3 is convex toward the object side and has positive refractive power.

The fourth lens L4 is concave toward the image side and has negative refractive power.

The fifth lens L5 is convex toward an image side in a paraxial region with regard to a central axis of incident light. In this case, both surfaces of the fifth lens L5 may be formed as aspherical surfaces.

Meanwhile, an optical filter OF configured of an infrared filter, a glass cover, or the like, is included between the fifth lens L5 and the image plane IP. In particular, the optical filter OF according to the present embodiment may be an IR cut filter. The IR cut filter serves to remove radiant heat from external light so as not to transfer heat to the image plane. That is, the IR cut filter has a structure in which it allows visible light rays to be transmitted therethrough and reflects infrared rays to the outside.

In addition, the image plane IP on which an image is formed may be configured of an image sensor converting optical signals corresponding to a subject image into electrical signals. In this case, the image sensor may be configured of a CCD or CMOS sensor.

The subminiature optical system 100 according to the embodiment of the present invention may provide thinness to the optical system 100 and high definition resolution by ideally setting a ratio of a distance from an object side surface of the first lens L1 to the image plane to a focal distance of the entire optical system, and a ratio of a radius of curvature of an object side surface of the first lens to a focal distance of the entire optical system.

Here, all surfaces of the first lens L1, the second lens L2, the third lens L3, the fourth lens L4, and the fifth lens L5 according to the present embodiment may be formed as aspherical surfaces. Therefore, the subminiature optical system 100 may be implemented to be compact while being configured of five lens sheets and having high resolution. In addition, in the case in which all of the first lens L1, the second lens L2, the third lens L3, the fourth lens L4, and the fifth lens L5 are formed of a plastic material, an aspheric lens may be easily and economically manufactured.

In addition, the fourth lens L4 according to the present embodiment may be formed so that an Abbe number thereof exceeds 50.

Further, the subminiature optical system 100 according to the present embodiment may prevent a phenomenon in which the periphery of the image sensor becomes dark and image distortion occurs, by reducing an incident angle of an edge of the lens to allow amounts of light in the central portion and the periphery of the image sensor to be uniform, and to secure as high a level of ambient light as possible by appropriately forming aspherical surfaces on respective lenses, for example, configuring the first lens L1, the second lens L2, the third lens L3, and the fourth lens L4 to sequentially have positive refractive power, negative refractive power, positive refractive power and negative refractive power, forming an inflection point on the object side surface of the fifth lens L5, and the like.

In particular, the subminiature optical system according to the present embodiment may include the fourth lens having both surfaces formed to be concave thereon in order to form the view angle to be relatively narrow (for example, 35 degrees or less). In addition, the object side surface of the fifth lens may have the inflection point in a location thereof other than a location corresponding to the optical axis. According to the structure of the fifth lens as described above, a chief ray angle (CRA) of the fifth lens and the CRA of the image sensor (i.e., the image plane) are matched, such that an amount of light in the periphery of the image sensor may be secured.

Meanwhile, in the case in which the fifth lens has no inflection point, matching properties with the image sensor are degraded and through-the-lens (TTL) metering may be too long, such that it may be difficult to implement thinness.

Under the entire configuration as described above, acting effects of the following Conditional Equations 1 through 6 will be described.

$$0.7 < TTL/F < 1.0 \qquad \text{(Conditional Equation 1)}$$

Where TTL is a distance from a first surface, an object side surface, of the optical lens to the image plane, and F is the focal distance of the optical system.

Conditional Equation 1 is a relationship between TTL and power. Therefrom, the TTL is designed to be significantly shorter than the focal distance F of the optical system, such that it may be appreciated that this is contrasted to a camera module according to the related art.

Here, in the case in which a value of TTL/F is decreased by increasing the focal distance F, the view angle of the optical system (FOV) may be further decreased. However, since it is difficult to decrease TTL, the optical system becomes longer, such that it is difficult to implement thinness.

$$20 < FOV < 35 \quad \text{(Conditional Equation 2)}$$

Where, FOV is a view angle of the optical system.

Conditional Equation 2, an equation representing view angle characteristics of the optical system, has a ratio about 0.5 times greater than the view angle (for example, 60 through 75 degrees) of the subminiature camera module according to the related art. This may represent zoom characteristics of 2.5 through 3 times in the case of converting to a general zoom lens.

$$0.16 < rdy\ s1/F < 2 \quad \text{(Conditional Equation 3)}$$

where rdy s1 is a radius of curvature of an object side surface of the first lens, and F is the focal distance of the optical system.

Conditional Equation 3 is an equation representing characteristics for the radius of curvature of the first lens. A configuration capable of achieving thinness and a relatively small view angle is defined by decreasing the curvature of an object side surface of the first lens and increasing the focal distance.

$$Vd4 > 50 \quad \text{(Conditional Equation 4)}$$

Where, Vd4 is an Abbe number of the fourth lens.

Conditional Equation 4 defines material characteristics of the fourth lens. That is, the subminiature optical system according to the present embodiment has the fourth lens configured to have the Abbe number of 50 or more. When the optical system 100 is designed so that the fourth lens L4 satisfies a range of Conditional Equation 4, a chromatic aberration may be appropriately corrected.

Hereinafter, the present invention will be described through an example of specific numerical values.

The optical systems of the following embodiments 1 and 2 include the aperture stop (AS), the first lens L1, convex toward the object side, the second lens L2, concave toward the image side, the third lens L3, convex toward the object side, the fourth lens L4, concave toward the image side, and the fifth lens L5, convex toward the image side, sequentially from the object side, as described above. In addition, the first lens L1 may have positive refractive power, the second lens L2 may have negative refractive power, the third lens L3 may have positive refractive power, the fourth lens L4 may have negative refractive power, and the fifth lens L5 may have negative or positive refractive power.

In addition, an optical filter (OF) 11 and 12 configured of an infrared filter, a glass cover, or the like is included between the fifth lens L5 and the image plane IP.

The aspherical surface used in the following respective embodiments may be obtained from known Equation 1.

$$Z = \frac{cY^2}{1 + \sqrt{1-(1+K)c^2Y^2}} + AY^4 + BY^6 + CY^8 + DY^{10} + EY^{12} + FY^{14} + \ldots \quad \text{[Equation 1]}$$

Where, Z indicates a distance from the top of a lens in an optical axis direction.

Y indicates a distance in a direction vertical to an optical axis.

c indicates a radius of curvature at the top of the lens.

K indicates a Conic constant.

A, B, C, D, and E indicate fourth order, sixth order, eighth order, tenth order, and twelfth order aspherical surface coefficients, respectively.

Meanwhile, an aspherical surface used in the following embodiments is obtained from known Equation 1, and 'E used in the Conic constant (K) and aspherical surface coefficients (A, B, C, D, and E) and numerals next thereto' indicate powers of 10. For example, E+01 indicates $10^1$, and E-02 indicates $10^{-2}$.

Embodiment 1

The following Table 1 shows examples of numerical values according to a first embodiment of the present invention.

Figure 2:
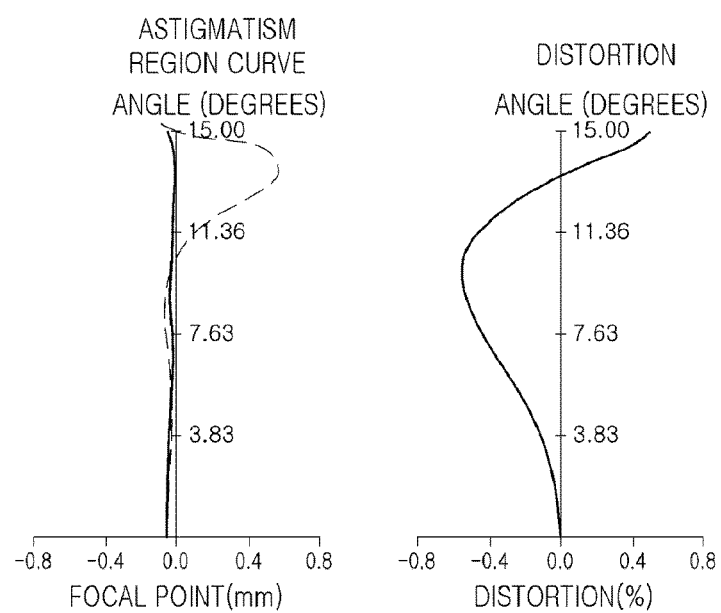
FIGS. 2 and 3 are graphs showing aberration characteristics of the optical system shown in FIG. 1.
Figure 3:
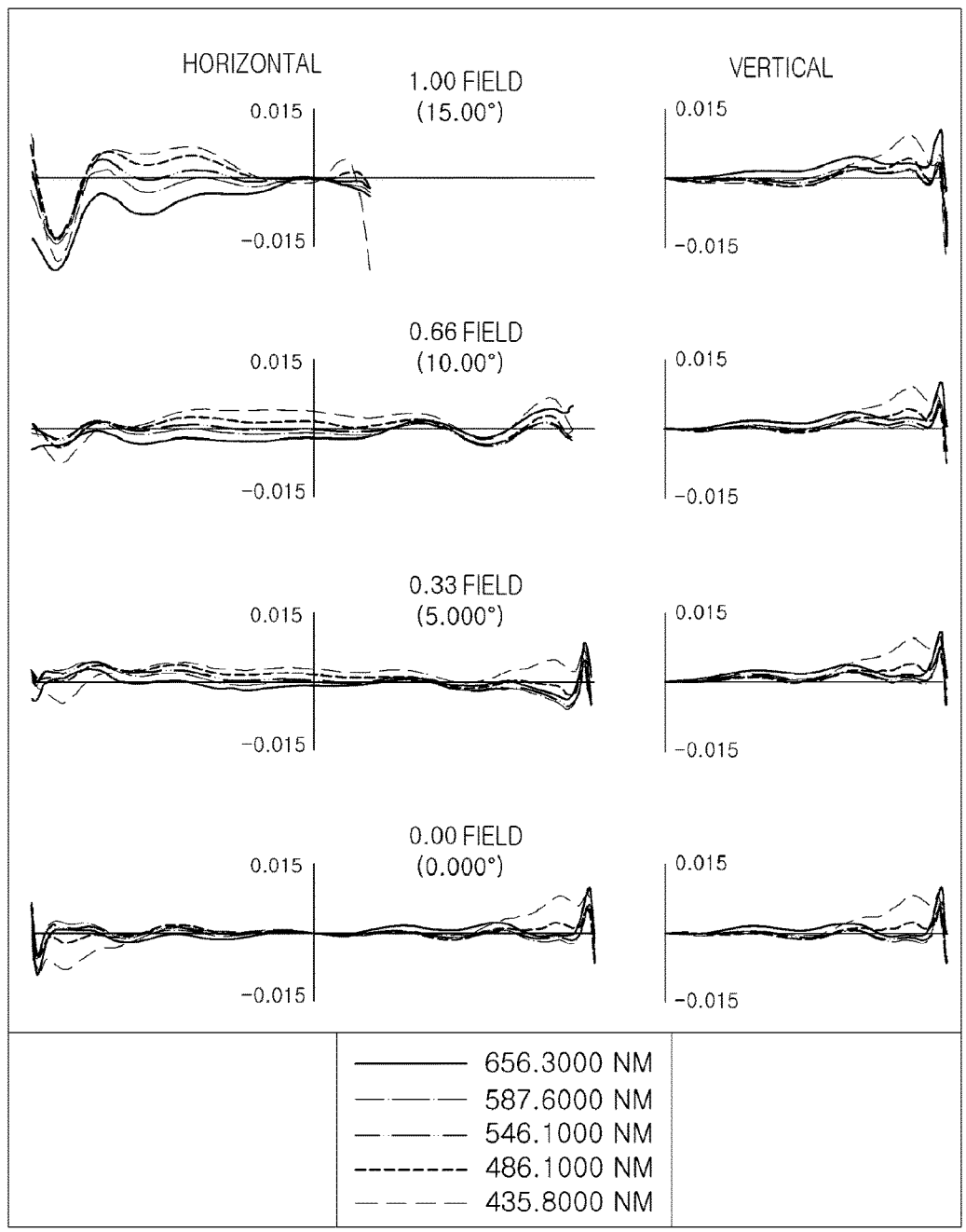

FIG. 1 is the configuration diagram of a lens showing lens disposition of a subminiature optical system according to the first embodiment of the present invention; and FIGS. 2 and 3 show aberration characteristics of the subminiature optical system shown in Table 1 and FIG. 1.

In the subminiature optical system according to the first embodiment of the present invention, F number FNo is 2.8, the view angle is 30 degrees, the entire focal distance F is 7 mm, the focal distance F1 of the first lens is 3.57 mm, the focal distance F2 of the second lens is −4.18 mm, the focal distance F3 of the third lens is 4.35 mm, the focal distance F4 of the fourth lens is −2.43 mm, and the focal distance F5 of the fifth lens is 14.18 mm.

In addition, the distance TTL from an object side surface of the first lens to the image plane is 5.8 mm.

TABLE 1

| Surface Number | Radius of Curvature | Thickness or Distance | Refractive Index | Abbe Number | Note |
|---|---|---|---|---|---|
| 1* | 1.34414 | 0.843041 | 1.544 | 56.0 | |
| 2* | 3.35746 | 0.1 | | | First lens |
| 3* | −15.4179 | 0.3 | 1.632 | 23.4 | |
| 4* | 3.25711 | 0.154324 | | | Second lens |
| 5* | 1.58574 | 0.491592 | 1.544 | 56.0 | |
| 6* | 4.23635 | 0.91273 | | | Third lens |
| 7* | −2.31497 | 0.2 | 1.544 | 56.0 | |
| 8* | 3.23536 | 0.655748 | | | Fourth lens |
| 9* | −6.89788 | 1.24256 | 1.544 | 56.0 | |
| 10* | −3.88237 | 0.1 | | | Fifth lens |
| 11 | ∞ | 0.3 | 1.517 | 64.2 | Filter |
| 12 | ∞ | 0.43 | | | |
| 13 | ∞ | 0 | | | Image plane |

In table 1, * indicates an aspherical surface, and in the first embodiment, refracting surfaces of all lenses are aspherical surfaces.

Values of aspherical surface coefficients of the first embodiment by Equation 1 are represented by the following Table 2.

TABLE 2

| Surface Number | Aspherical Surface Coefficient | | | | | |
|---|---|---|---|---|---|---|
| | A | B | C | D | E | F |
| 1 | −0.02171 | 0.048614 | −0.11407 | 0.103264 | −0.04102 | 0 |
| 2 | −0.06114 | 0.059542 | −0.10463 | 0.066754 | −0.01566 | 0 |
| 3 | 0.030857 | 0.116819 | −0.16033 | 0.11937 | −0.02948 | 0 |
| 4 | 0.029406 | 0.167422 | 0.059155 | −0.14472 | 0.321946 | 0 |
| 5 | −0.17147 | 0.011655 | −0.02614 | 0.182498 | −0.1343 | 0 |
| 6 | −0.09565 | −0.16018 | 0.098417 | −0.02775 | −0.07438 | −0.01875 |
| 7 | −0.28899 | −0.04165 | −0.66783 | 0.793086 | 1.77385 | −3.31921 |
| 8 | −0.04374 | −0.22428 | 0.415129 | 0.086281 | −0.61168 | −0.20163 |
| 9 | 0.036288 | 0.026006 | 0.00135 | −0.00211 | −0.00111 | −0.00032 |
| 10 | −0.11094 | 0.003295 | 0.02016 | 0.000246 | −0.00165 | −0.00019 |

Embodiment 2

The following Table 3 shows examples of numerical values according to a second embodiment of the present invention.

Figure 4:
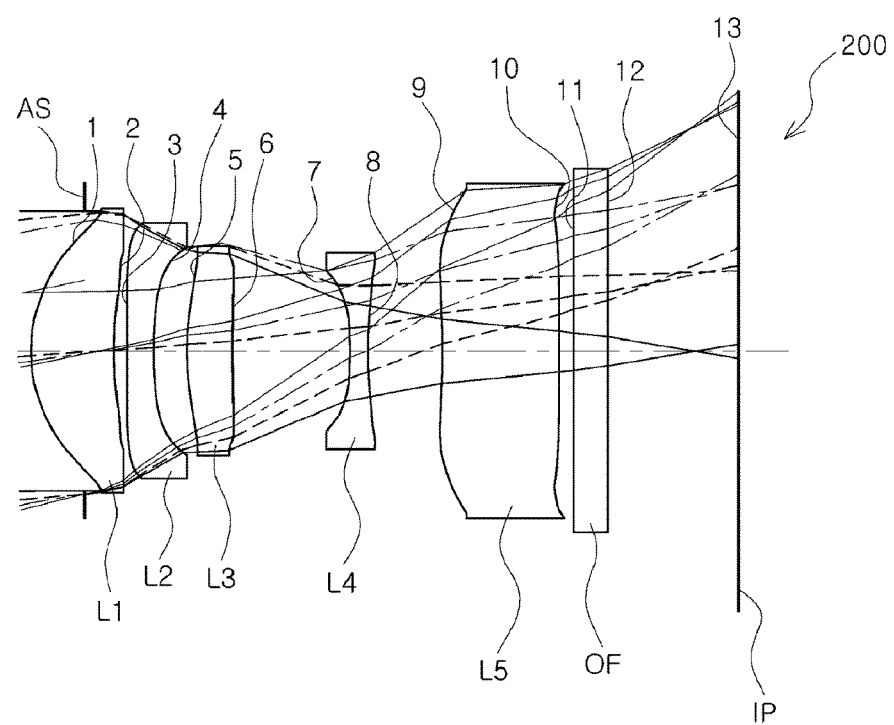
FIG. 4 is a lens configuration diagram showing a lens arrangement of a subminiature optical system according to a second embodiment of the present invention.
Figure 5:
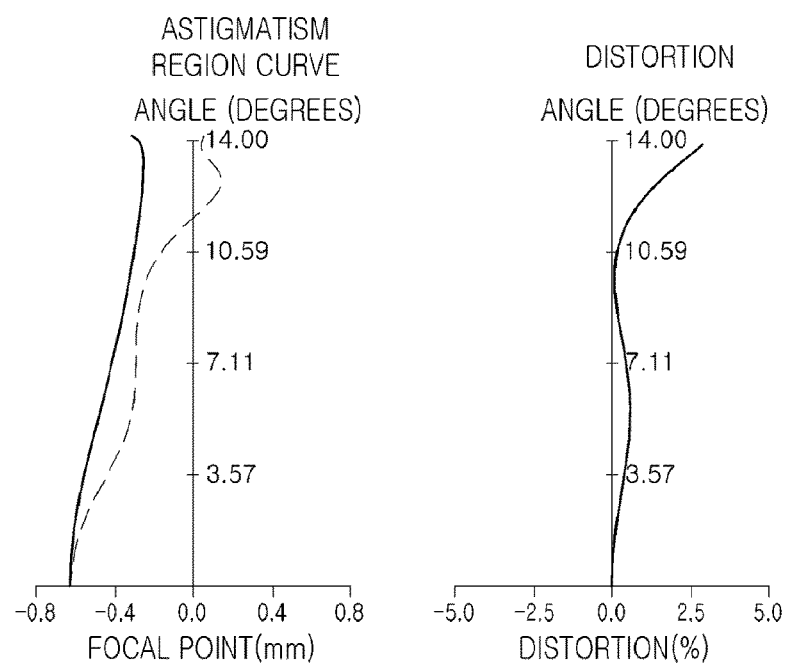
FIGS. 5 and 6 are graphs showing aberration characteristics of the optical system shown in FIG. 4.
Figure 6:
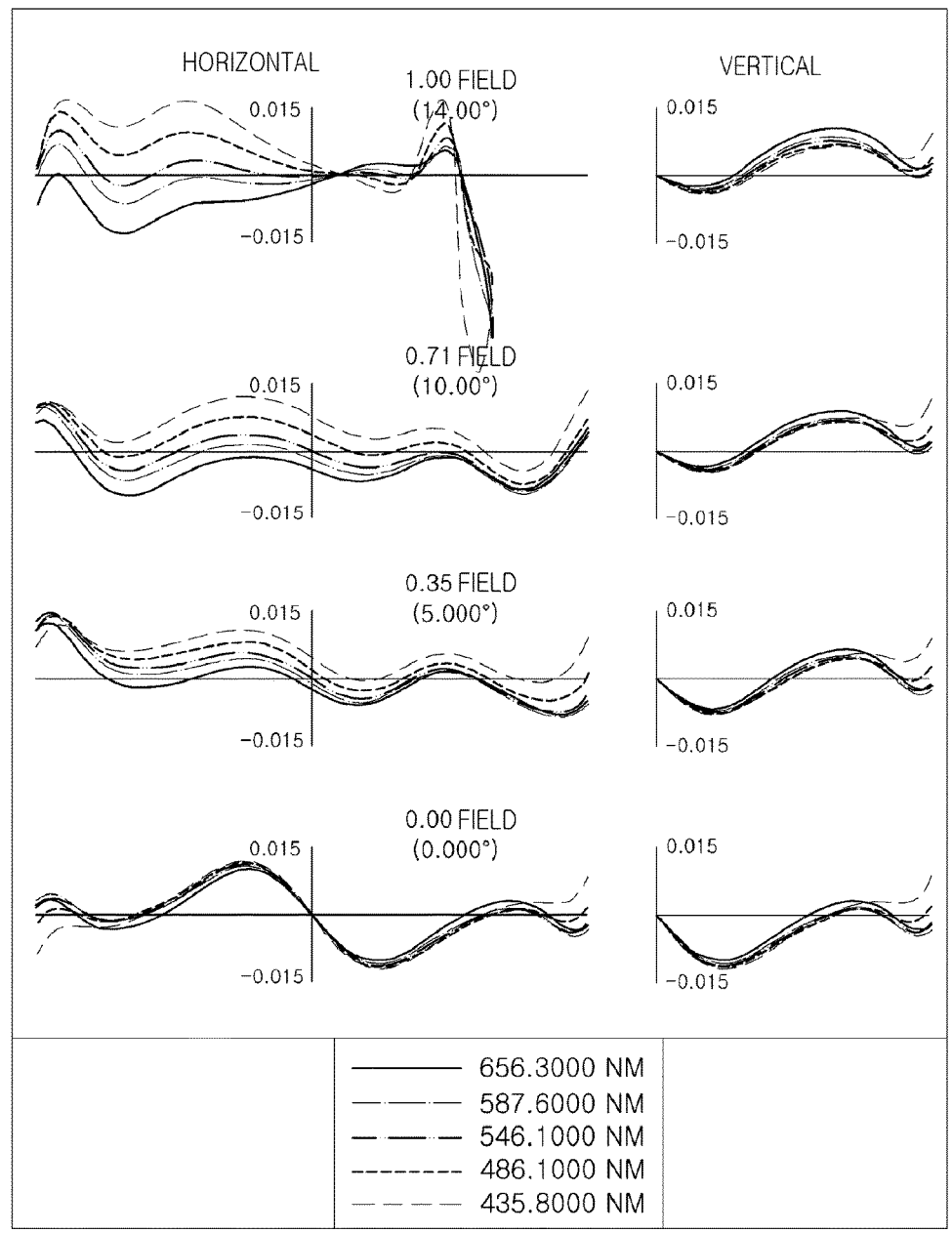

In addition, FIG. 4 is a configuration diagram of a lens showing lens disposition of a subminiature optical system 200 according to the second embodiment of the present invention; while FIGS. 5 and 6 show aberration characteristics of the subminiature optical system shown in Table 3 and FIG. 4.

In the second embodiment of the present invention, F number FNo is 2.8, the view angle is 28 degrees, the entire focal distance F of the optical system is 7.5 mm, the focal distance F1 of the first lens is 3.6 mm, the focal distance F2 of the second lens is −5.35 mm, the focal distance F3 of the third lens is 6.6 mm, the focal distance F4 of the fourth lens is −3.1 mm, and the focal distance F5 of the fifth lens is −16 mm.

In addition, the distance TTL from an object side surface of the first lens to the image plane is 6 mm.

TABLE 3

| Surface Number | Radius of Curvature | Thickness | Refractive Index | Abbe Number | Note |
|---|---|---|---|---|---|
| 1* | 1.38923 | 0.768867 | 1.544 | 56.0 | |
| 2* | 3.81076 | 0.1 | | | First lens |
| 3* | −28.1935 | 0.240438 | 1.632 | 23.4 | |
| 4* | 3.9058 | 0.306891 | | | Second lens |
| 5* | 2.10006 | 0.418991 | 1.544 | 56.0 | |
| 6* | 4.67386 | 1.07606 | | | Third lens |
| 7* | −3.1113 | 0.16 | 1.544 | 56.0 | |
| 8* | 3.78175 | 0.682294 | | | Fourth lens |
| 9* | −11.1737 | 1.08321 | 1.544 | 56.0 | |
| 10* | 50.6176 | 0.131032 | | | Fifth lens |
| 11 | ∞ | 0.3 | 1.517 | 64.2 | Filter |

TABLE 3-continued

| Surface Number | Radius of Curvature | Thickness | Refractive Index | Abbe Number | Note |
|---|---|---|---|---|---|
| 12 | ∞ | 1.18 | | | |
| 13 | ∞ | 0 | | | Image plane |

In the table 3, * indicates an aspherical surface, and in the first embodiment, refracting surfaces of all lenses are aspherical surfaces.

Values of aspherical surface coefficients of the second embodiment by Equation 1 are represented by the following Table 2.

TABLE 4

| Surface Number | Aspherical Surface Coefficient | | | | | |
|---|---|---|---|---|---|---|
| | A | B | C | D | E | F |
| 1 | −0.03393 | 0.059682 | −0.11593 | 0.103418 | −0.03959 | 0 |
| 2 | −0.05772 | 0.058269 | −0.10563 | 0.065873 | −0.01574 | 0 |
| 3 | 0.019895 | 0.112853 | −0.16386 | 0.118746 | −0.02814 | 0 |
| 4 | 0.047392 | 0.071129 | 0.128642 | −0.17021 | 0.225302 | 0 |
| 5 | −0.17914 | 0.061085 | −0.0907 | 0.15285 | −0.09738 | 0 |
| 6 | −0.10604 | −0.16863 | 0.135673 | −0.0162 | −0.08815 | −0.03569 |
| 7 | −0.3988 | 0.478275 | −1.32947 | 0.094656 | 1.84743 | −1.47638 |
| 8 | −0.02051 | −0.24644 | 0.394981 | 0.069601 | −0.59853 | −0.15297 |
| 9 | 0.036293 | 0.026184 | 0.001117 | −0.00217 | −0.00112 | −0.00033 |
| 10 | −0.0485 | −0.00536 | 0.017149 | −0.00062 | −0.00185 | −0.00021 |

Through the above-mentioned embodiments of the present invention, as shown in FIGS. 2, 3, 5, and 6, the subminiature optical system with excellent high definition while having a small size and a relatively narrow view angle may be obtained.

In particular, since the subminiature optical system has the relatively narrow view angle and is configured of five lens sheets, the subminiature optical system having high resolution and thinness may be implemented.

In addition, since the subminiature optical system has the narrow view angle, it may clearly capture an image of a subject at long distance.

The subminiature optical system according to the present embodiment may be used solely in a portable device. However, in this case, it may be inconvenient to capture an image having a wide background.

Therefore, the subminiature optical system according to the present embodiment may be employed in a portable device or the like as part of a pair with an optical system having a wide view angle.

Figure 7:
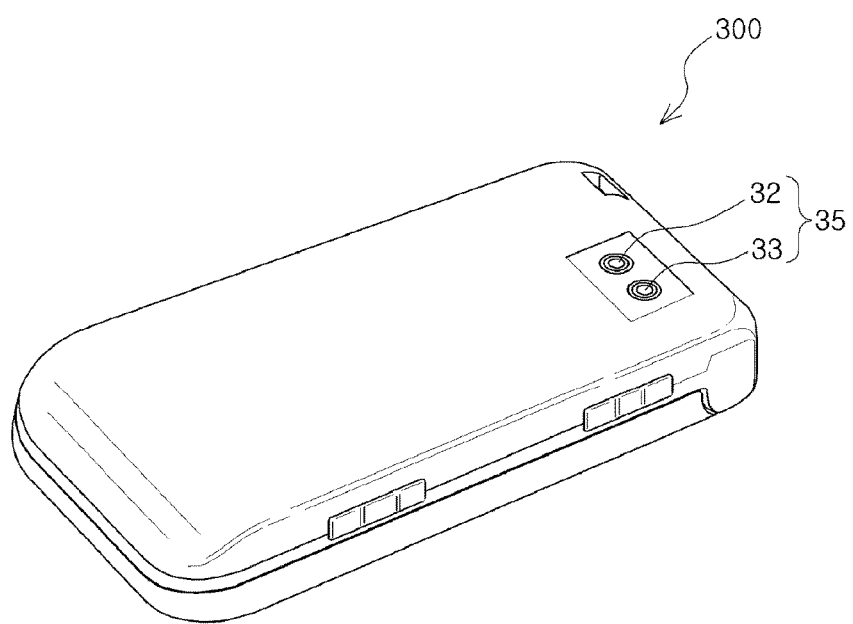
FIG. 7 is a perspective diagram schematically showing a portable device according to an embodiment of the present invention.

FIG. 7 is a perspective diagram schematically showing a portable device according to an embodiment of the present invention.

Referring to FIG. 7, the portable device 300 according to the present embodiment includes a camera module 35, wherein the camera module 35 may include at least two subminiature optical systems 32 and 33.

Here, the two subminiature optical systems 32 and 33 may be a first optical system 32 having the relatively wide view angle and a second optical system 33 having the relatively narrow view angle.

In addition, the first optical system 32 may be an optical system having the view angle between 60 degrees and 80 degrees, and the second optical system 33 may be an optical system having the view angle of 35 degrees or less as described above.

As such, in the case in which one portable device 300 is provided with the first optical system 32 and the second optical system 33, the wide background may be imaged at the wide angle using the first optical system 32, and a subject at long distance may also be clearly imaged using the second optical system 33, as needed.

In addition, when imaging the subject, the first optical system 32 and the second optical system 33 are simultaneously driven so as to capture two images at once, such that images having different focal distances may be simultaneously captured and a task such as an image synthesis or the like may be performed, as needed.

As set forth above, since the subminiature optical system according to the embodiment of the present invention only uses five sheets of lenses, the subminiature optical system having a compact shape and a short overall length due to a lower lens configuration number may be provided.

In addition, as set forth above, the subminiature optical system according to the embodiment of the present invention may promote lightness by using the lens formed of the plastic material, may be mass-produced due to ease of fabrication, and may significantly reduce manufacturing costs.

In addition, as set forth above, the subminiature optical system according to the embodiment of the present invention may have the narrow view angle of 35 degrees or less. Therefore, the subminiature optical system according to the embodiment of the present invention may clearly image a subject at long distance.

In addition, as set forth above, the portable device according to the embodiment of the present invention may include the first optical system having a relatively wide view angle and the second optical system having a narrow view angle. Therefore, the wide background may be imaged at the wide angle using the first optical system, and the subject at the long distance may also be clearly imaged using the second optical system, as needed.

While the present invention has been shown and described in connection with the embodiments, it will be apparent to those skilled in the art that modifications and variations can be made without departing from the spirit and scope of the invention as defined by the appended claims.

What is claimed is:

1. An optical system, comprising:
    a first optical system; and
    a second optical system having an angle of view narrower than that of the first optical system,
    wherein the second optical system comprises a plurality of lenses sequentially disposed from an object side,
    wherein lenses disposed toward the object side are defined as a first group, and lenses disposed toward an image side are defined as a second group, based on a greatest distance on an optical axis between the lenses,
    wherein the first group has a total of three plastic lenses, including a first lens, a second lens, and a third lens;
    wherein the second group has a total of two plastic lenses, including a fourth lens and a fifth lens;
    wherein the fifth lens, disposed farthest from the object side among the lenses of the second group, has positive refractive power and at least one inflection point, and
    wherein the second optical system satisfies the following conditional expression:

$$0.7<TTL/F<1.0,$$

where TTL is a distance on the optical axis between an object-side surface of the first lens, among the lenses, disposed closest to the object side and an image plane of an image sensor, and F is a focal length of the second optical system.

2. The optical system of claim 1, wherein the first lens has positive refractive power.

3. The optical system of claim 2, wherein the first lens has an object-side surface and an image-side surface, each of the object-side surface and the image-side surface is an aspherical surface, and the object-side surface is convex.

4. The optical system of claim 1, wherein the fourth lens has negative refractive power.

5. The optical system of claim 4, wherein the fourth and fifth lenses each have an aspherical surface.

6. The optical system of claim 1, wherein a view angle difference between the first optical system and the second optical system is greater than 25 degrees and less than 80 degrees.

7. The optical system of claim 1, wherein the second optical system has the view angle of 20 degrees through 35 degrees.

8. The optical system of claim 1, wherein the first optical system has the view angle of 60 degrees through 80 degrees.

9. The optical system of claim 1, wherein the second lens has negative refractive power.

10. The optical system of claim 1, wherein an image-side surface of the second lens is concave.

11. The optical system of claim 1, wherein the third lens has positive refractive power.

12. The optical system of claim 1, wherein an object-side surface of the third lens is convex.

13. The optical system of claim 1, wherein an image-side surface of the third lens is concave.

14. The optical system of claim 1, wherein an object-side surface of the fourth lens is concave.

15. The optical system of claim 1, wherein an image-side surface of the fourth lens is concave.

16. The optical system of claim 1, wherein an object-side surface of the fifth lens is concave.

17. The optical system of claim 1, wherein an image-side surface of the fifth lens is convex.

* * * * *